Jan. 18, 1927.
L. C. HESTER
1,614,674
PLOW
Filed April 18, 1925
2 Sheets-Sheet 1
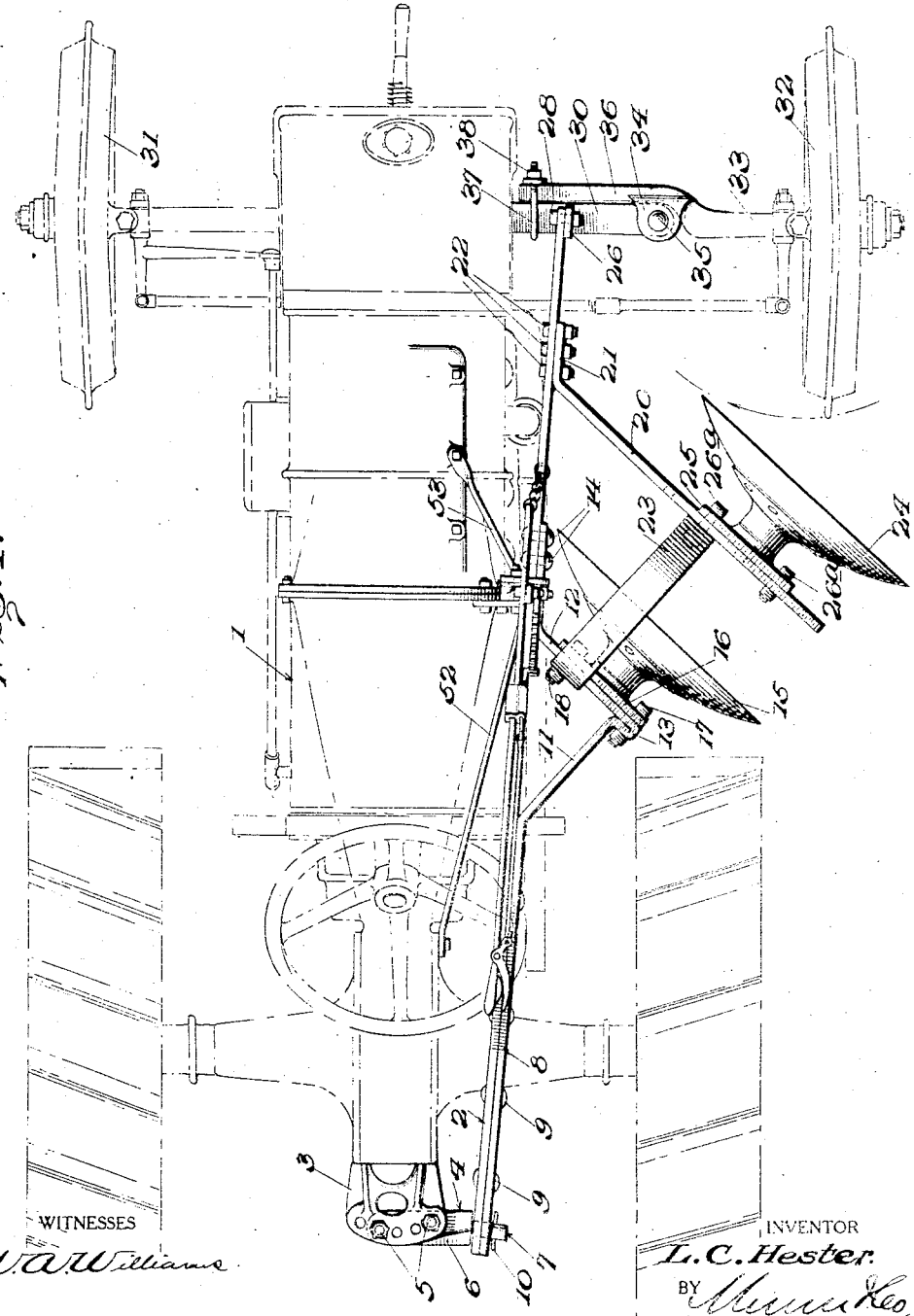
WITNESSES
W. A. Williams
INVENTOR
L. C. Hester.
BY
ATTORNEYS Jan. 18, 1927.
L. C. HESTER
PLOW
Filed April 18, 1925    2 Sheets-Sheet 2
1,614,674
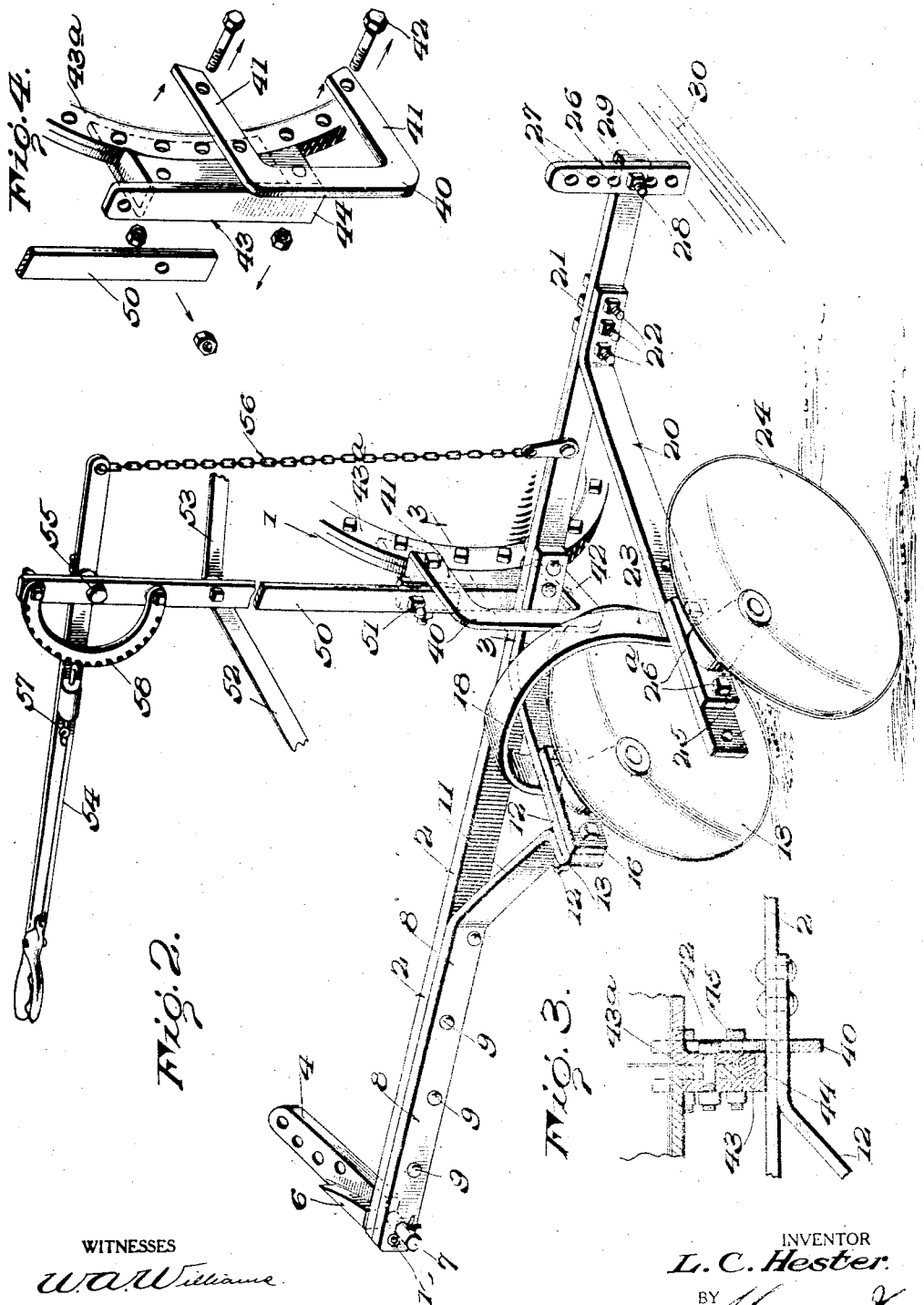
INVENTOR
L. C. Hester.
BY
ATTORNEYS Patented Jan. 18, 1927.

1,614,674

UNITED STATES PATENT OFFICE.

LEVI C. HESTER, OF WILLISTON, FLORIDA.

PLOW.

Application filed April 18, 1925. Serial No. 24,197.

This invention relates to plows of the type especially designed for use on motor vehicles, such as tractors or the like.

One of the principal objects of the present invention resides in the provision of a plow of this character which may and does employ a double disc plow arrangement in such a manner as to take advantage of the powerful pushing or propelling action of the tractor and also develop the maximum efficiency of the double disc plow arrangement in such a manner as to eliminate side drafts.

Another object of the invention resides in the provision of a plow having the advantages and capacities mentioned and wherein the depth of cut is easily and accurately controlled.

A further object resides in the provision of a plow of the character specified which is so constructed and organized as to be readily lifted and otherwise controlled.

A still further object resides in the provision of a plow having the advantages and capacities enumerated and which is of simple and durable construction, reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a plan view of a plow constructed in accordance with the present invention, Figure 2 is a perspective view of the plow, only a fragment of the tractor being shown, Figure 3 is a view in horizontal section on the line 3—3 of Figure 2, and Figure 4 is a group view in perspective showing the parts of the guide for the plow beam prior to assembly.

Referring to the drawings the numeral 1 designates a tractor. A push bar, designated generally at 2, is provided and has its rear end pivotally connected to the draw bar hitch 3 of the tractor by means of a bracket plate 4 bolted, as at 5, to the hitch and having a strengthening and bracing lug 6 engageable with the hitch 3 to aid the bolt 5 in holding the bracket in position and also serving to increase the structure and strength of the bracket. A pivot pin 7 is integrally formed with the bracket 4 and is operatively fitted in an opening provided therefor in the rear end of the push bar 2 and in the rear end of a plow beam 8 secured by rivets or bolts 9 to the push bar 2. A cotter pin 10 prevents accidental displacement of the push bar 2 and plow beam 8 from the pin 7.

Intermediate its ends the plow beam 8 has reversely bent or inclined portions 11 and 12 connected by a doubled connecting portion 13. The outer or forward end of the plow beam is fastened, as at 14, to the push bar 2. A disc plow 15 is provided and is rotatably mounted in its boxing 16, the latter being bolted, as at 17, to the doubled connecting portion 13 and being also bolted, as at 18, to the inclined portion 12 of the plow beam 8.

A second plow beam 20 is provided and is disposed in substantial parallelism with the inclined portion 12 of the plow beam or carrier 8. The plow beam 20 has an attaching portion 21 fitted flush up against the push bar 2 and fastened to the push bar by bolts and nuts 22. A curved brace 23 extends between the inclined portion 12 of the plow beam or carrier 8 and the plow beam or carrier 20 and has its ends secured to the beams 8 and 20. The intermediate portion of the curved brace 23 overlies the disc plow 15. A second disc plow 24 is provided and is rotatably mounted in its boxing 25, the boxing being fastened by bolts 26ª to the plow beam or carrier 20.

At its forward end the push bar 2 is provided with a depth gage which consists simply of a bar 26 having a series of vertically aligned openings 27, any one of which may receive a bolt 28 extended through an opening in the forward end of the push bar 2 and fastened by means of a nut 29. The lower end of the bar 26 rests on the front axle 30 of the tractor.

One front steering wheel 31 of the tractor is connected to one end of the axle 30 in the ordinary way but the other front steering wheel 32 is mounted on an extension 33 which may be a steel casting and which has a pair of horizontally disposed and parallel apertured ears 34 fastened by a bolt or rivet 35 to one end of the axle 30. The ears 34 snugly engage the upper and lower sides of the axle and provide a socket for the axle. Beyond the ears 34 the casting or extension 33 is formed with an arm 36 which engages the front side of the axle and which is fastened thereto by a U-bolt 37 and nuts 38. The extension 33 provides the requisite clearance for the disc plow 24.

A U-shaped guide 40 is provided for the plow beams and push bar and has its legs 41 bolted by means of bolts and nuts 42 to the flanges 43ª of the main tractor housing. These same bolts and nuts 42 serve to secure in position an angle bracket 43, a flange 44 of which provides a wear plate and a thrust plate for the push bar 2. Between the flange 44 and the flanges 43ª a filler block 45 is fastened and secured.

A standard 50 has its lower end secured by a blot and nut 51 to the upper end of the angle bracket 43 and the standard is maintained in vertical position by means of braces 52 and 53. A hand operated lift lever 54 is pivotally mounted, as at 55, on the standard 50 and has its short arm connected by a chain 56 to the push bar 2 and consequently to the plow beams and carriers 8 and 20. The long arm of the hand lever 54 is equipped with a spring pressed and grip released latch 57 which co-acts with a notch or tooth quadrant 58 fastened to the standard 50.

It is to be understood that the reversible plow box forming the subject-matter of my application executed under even date with the present case may be utilized with the present invention by removing the plow boxes 16 and 25.

The plow beam 20, brace 23, plow 24 and plow box 25 may be omitted and a single disc plow used with the reversible plow box on the inclined portion 12 of the beam or plow carrier 8, when it is desired to use the reversible plow box.

I claim:—

1. A plow for use on tractors comprising a push bar, two plow carriers connected with the push bar, the plow carriers having substantially parallel inclined portions, two disc plows mounted on the inclined portions of the plow carriers, and a curved brace having its ends secured to the inclined portions of the carriers, the brace overlying the rearwardly disposed disc plow.

2. A plow for use on tractors comprising a push bar, two plow carriers connected with the push bar, each plow carrier having a portion fitted flush up against the push bar and fastened thereto, the plow carriers connected with the push bar, each plow carrier having a portion fitted flush up against the push bar and fastened thereto, the plow carriers having substantially parallel inclined portions, the rearwardly disposed plow carrier being connected with the push bar on the opposite sides of its inclined portion, a disc plow connected to the inclined portion of each plow carrier, and a curved brace bar between the inclined portions.

LEVI C. HESTER.